United States Patent
Yoshiuchi et al.

(10) Patent No.: US 8,494,595 B2
(45) Date of Patent: Jul. 23, 2013

(54) COMMUNICATION CONTROL APPARATUS

(75) Inventors: Hideya Yoshiuchi, Beijing (CN); Peng Yang, Beijing (CN); Lu Geng, Beijing (CN); Yuanchen Ma, Beijing (CN)

(73) Assignee: Hitachi, Ltd., Tokyo (JP)

( * ) Notice: Subject to any disclaimer, the term of this patent is extended or adjusted under 35 U.S.C. 154(b) by 356 days.

(21) Appl. No.: 12/875,746

(22) Filed: Sep. 3, 2010

(65) Prior Publication Data

US 2011/0059763 A1    Mar. 10, 2011

(30) Foreign Application Priority Data

Sep. 7, 2009   (CN) .......................... 2009 1 0173123

(51) Int. Cl.
*H04M 1/00*    (2006.01)
(52) U.S. Cl.
USPC ............................ 455/574; 455/561; 370/311
(58) Field of Classification Search
USPC .................. 455/436, 443, 450, 452.1, 452.2, 455/453, 574, 561; 370/311, 328, 329, 331, 370/332
See application file for complete search history.

(56) References Cited

U.S. PATENT DOCUMENTS

| | | | |
|---|---|---|---|
| 6,584,330 B1 * | 6/2003 | Ruuska ......................... | 455/574 |
| 6,990,362 B2 | 1/2006 | Simpson et al. | |
| 7,130,287 B2 * | 10/2006 | Nounin et al. ................ | 370/332 |
| 7,532,914 B2 * | 5/2009 | Kurokawa ..................... | 455/574 |
| 2006/0039345 A1 | 2/2006 | Perez-Costa | |

FOREIGN PATENT DOCUMENTS

| | | |
|---|---|---|
| CN | 101179814 A | 11/2007 |
| EP | 1610441 A2 | 10/2002 |
| JP | 2006-60788 | 8/2004 |
| WO | WO 2009/067956 A1 | 6/2009 |

* cited by examiner

*Primary Examiner* — Quochien B Vuong
(74) *Attorney, Agent, or Firm* — Antonelli, Terry, Stout & Kraus, LLP.

(57) ABSTRACT

A communication control apparatus includes a receiver that receives communication conditions between each of the base stations and a mobile terminal within a serving area; and a controller that performs control over energy consumption of each of the base stations and turns on or off power supplies of wireless communication modules of a part of a plurality of wireless communication modules in each of the base stations based on the communication conditions. Further, the communication control apparatus performs control over a plurality of base stations that provide service to mobile terminals, and performs scheduling for energy consumption between networks to thereby perform energy scheduling of a mobile network realizing energy saving of the entire network.

4 Claims, 12 Drawing Sheets

| BASE STATION NUMBER | PEAK-TIME LEVEL 1 (100%) | PEAK-TIME LEVEL 2 (60%) | PEAK-TIME LEVEL 3 (30%) | PEAK-TIME LEVEL 4 (0%, TURN OFF RF) | PEAK-TIME LEVEL 5 (0%, TURN OFF BASE STATION) |
|---|---|---|---|---|---|
| | 901 | 902 | 903 | 904 | 905 | 906 |
| BASE STATION 1 | 8:00-11:00<br>14:00-22:00 | 11:00-14:00 | 5:00-8:00<br>22:00-24:00 | 4:00-5:00<br>24:00-1:00 | 1:00-4:00 |
| BASE STATION 2 | 6:00-22:00 | 22:00-1:00 | 1:00-6:00 | NONE | NONE |
| BASE STATION 3 | 8:00-21:00 | 21:00-24:00 | 5:00-8:00 | 24:00-5:00 | None |
| BASE STATION 4 | 7:00-11:00<br>13:00-22:00 | 11:00-13:00 | 5:00-7:00<br>22:00-24:00 | 4:00-5:00<br>24:00-1:00 | 1:00-4:00 |
| ...... | ...... | ...... | ...... | ...... | ...... |
| BASE STATION n | 8:00-11:00<br>14:00-22:00 | 11:00-14:00 | 5:00-8:00<br>22:00-24:00 | 4:00-5:00<br>24:00-1:00 | 1:00-4:00 |

| | 701 | 702 | 703 | 704 | 705 | 706 | 707 | | | | | | |
|---|---|---|---|---|---|---|---|---|---|---|---|---|---|
| BASE STATION NUMBER | TURNING ON/ TURNING OFF/ MAKING DORMANT | BASE STATION IN WHICH SERVING AREAS ARE OVERLAPPED | PRESENT UTILIZATION RATE | THE NUMBER OF TERMINALS PROVIDING SERVICE AT PRESENT | TERMINAL IDENTIFIER | SERVICE PERCENTAGE | TERMINAL IDENTIFIER | SERVICE PERCENTAGE | TERMINAL IDENTIFIER | SERVICE PERCENTAGE | TERMINAL IDENTIFIER | SERVICE PERCENTAGE | ...... |
| BASE STATION 1 | TURNING ON | BASE STATION 2 | 30% | 1 | TERMINAL 3 | 10% | NONE | NONE | NONE | NONE | NONE | NONE | NONE |
| BASE STATION 2 | TURNING ON | BASE STATION 1, BASE STATION 3 | 70% | 4 | TERMINAL 1 | 5% | TERMINAL 2 | 15% | TERMINAL 3 | 20% | TERMINAL 4 | 10% | None |
| BASE STATION 3 | TURNING ON | BASE STATION 2, BASE STATION 4 | 50% | 2 | TERMINAL 3 | 20% | TERMINAL 4 | 10% | NONE | NONE | NONE | NONE | NONE |
| BASE STATION 4 | TURNING OFF | BASE STATION 3 | 0 | 0 | NONE | NONE | NONE | NONE | NONE | NONE | NONE | NONE | NONE |
| ...... | ...... | ...... | ...... | ...... | ...... | ...... | ...... | ...... | ...... | ...... | ...... | ...... | ...... |
| BASE STATION n | MAKING DORMANT | NONE | 0 | 0 | NONE | NONE | NONE | NONE | NONE | NONE | NONE | NONE | NONE |

FIG.8

| TERMINAL NUMBER 801 | PRESENT STATUS 802 | PRESENT SPEED 803 | MAIN SERVICE BASE STATION 804 | ANOTHER SERVICE BASE STATION 805 | ANOTHER SERVICE BASE STATION 806 | ANOTHER SERVICE BASE STATION 807 |
|---|---|---|---|---|---|---|
| TERMINAL 1 | ACTIVE (active) | 2.1 Mbps | BASE STATION 2 | N/A | N/A | N/A |
| TERMINAL 2 | ACTIVE (active) | 1.7 Mbps | BASE STATION 2 | N/A | N/A | N/A |
| TERMINAL 3 | ACTIVE (active) | 0.6 Mbps | BASE STATION 3 | BASE STATION 1 | N/A | N/A |
| TERMINAL 4 | ACTIVE (active) | 5.2 Mbps | BASE STATION 3 | BASE STATION 2 | BASE STATION 4 | N/A |
| ...... | ...... | ...... | ...... | ...... | ...... | ...... |
| TERMINAL n | DORMANT (dormant) | 0 | N/A | N/A | N/A | N/A |

FIG.9

| 901 | 902 | 903 | 904 | 905 | 906 |
|---|---|---|---|---|---|
| BASE STATION NUMBER | PEAK-TIME LEVEL 1 (100%) | PEAK-TIME LEVEL 2 (60%) | PEAK-TIME LEVEL 3 (30%) | PEAK-TIME LEVEL 4 (0%, TURN OFF RF) | PEAK-TIME LEVEL 5 (0%, TURN OFF BASE STATION) |
| BASE STATION 1 | 8:00-11:00<br>14:00-22:00 | 11:00-14:00 | 5:00-8:00<br>22:00-24:00 | 4:00-5:00<br>24:00-1:00 | 1:00-4:00 |
| BASE STATION 2 | 6:00-22:00 | 22:00-1:00 | 1:00-6:00 | NONE | NONE |
| BASE STATION 3 | 8:00-21:00 | 21:00-24:00 | 5:00-8:00<br>22:00-24:00 | 24:00-5:00 | None |
| BASE STATION 4 | 7:00-11:00<br>13:00-22:00 | 11:00-13:00 | 5:00-7:00<br>22:00-24:00 | 4:00-5:00<br>24:00-1:00 | 1:00-4:00 |
| ... | ...... | ...... | ...... | ...... | ...... |
| BASE STATION n | 8:00-11:00<br>14:00-22:00 | 11:00-14:00 | 5:00-8:00<br>22:00-24:00 | 4:00-5:00<br>24:00-1:00 | 1:00-4:00 |

COMMUNICATION CONTROL APPARATUS

INCORPORATION BY REFERENCE

The present application claims priority from Chinese application CN200910173123.4 filed on Sep. 7, 2009, the content of which is hereby incorporated by reference into this application.

BACKGROUND OF THE INVENTION

The present invention relates to a communication control apparatus in a mobile communication network and, more particularly, to a communication control apparatus for performing energy scheduling in the mobile communication network.

In a mobile communication, an energy-saving technique of a mobile network becomes a more significant challenge. In particular, in China, all mobile managers of China, for example, "China Telecom", "China Mobile", and "China Unicom" give assurance that energy consumption of network equipments is reduced. For example, "China Mobile" pronounces that 40% (8 hundred-millions kwh of electric power, 27 millions tons of standard coal, and 5 millions 700 thousands tons of the discharge amount of carbon dioxide) of wireless network energy consumption is saved up to year 2010 as compared with that of year 2005.

A number of network equipment manufacturers, for example, "Huawei" and "Motorola" pour their efforts into an energy-saving technology in a system of a single base station. Further, a number of terminal manufacturers, for example, "ZTE", "NEC", and "Nokia" propose a technology of a network side convenient to terminal energy saving.

However, when viewed from the entire mobile network system, a technology in which the energy scheduling of a large-sized mobile network can be performed has been not developed yet.

SUMMARY OF THE INVENTION

Along with an unceasing installation of B3G/4G a number of base stations are extremely densely arranged and a network coverage between these base stations is significantly overlapped. At present, a scheduling technology of a network side is already used for an improvement in a network service performance. In this case, all the base stations consume an electric power at a full load. However, in the case where the load of a network is not heavy so much and a load distribution is extremely nonuniform, even when users are not present so much in the network and the load is not heavy, energy consumption of the entire network cannot be reduced. In the above-described case, even if a system of a single base station has an energy-saving function, since each other's collaboration is absent between the base stations and also a unified scheduling for the entire network is absent, it fails to reach an optimized energy-saving performance. To cope with the above-described matter, an energy scheduling technology for a large-sized mobile network is required to be proposed.

In short, the energy saving of a number of mobile networks is used for only the single base station system at present, and an energy saving method in which a network is centered is not developed yet.

In view of the foregoing, it is an object of the present invention to provide a communication control apparatus that performs energy scheduling of a mobile network. Further, it is an object of the present invention to perform scheduling for energy consumption between networks to thereby make energy consumption of the entire network equal to realize the energy saving of the entire network.

To accomplish the above objects, according to one aspect of the present invention, there is provided a communication control apparatus for performing control over a plurality of base stations that provide service to mobile terminals. This communication control apparatus includes a receiver that receives communication conditions between each of the base stations and a mobile terminal within a serving area; and a controller that performs control over energy consumption of each of the base stations and turns on or off power supplies of wireless communication modules of a part of a plurality of wireless communication modules in each of the base stations based on the communication conditions.

According to another aspect of the present invention, each of the base stations has an overlapping serving area with at least one of the other base stations; and based on the communication conditions, the communication control apparatus performs a communication traffic shift, changes a communication between the mobile terminal and the base station into that between the mobile terminal and another base station within the overlapping serving area, and controls turning on or off of a power supply of the wireless communication module within the base station before and after the change.

According to yet another aspect of the present invention, based on each time band of each of the base stations, the communication control apparatus previously determines the number of the wireless communication modules necessary for turning on a power supply in advance, and sets the number of the wireless communication modules necessary for turning on a power supply in advance more than that of service demands at a peak time in each time band of each of the base stations.

The proposed communication control apparatus according to the present invention has a configuration in which energy consumption of the entire network can be optimized and a basic base station system of the entire network is not required to be modified.

Other objects, features and advantages of the invention will become apparent from the following description of the embodiments of the invention taken in conjunction with the accompanying drawings.

DETAILED DESCRIPTION OF THE INVENTION

Preferred embodiments of the present invention will now be described in detail below with reference to the accompanying drawings, wherein like reference numerals refer to like elements throughout. The embodiment is described below based on a communication system of 3GPP LTE-A. The present invention is applicable also to a mobile communication network for supporting a cooperation service with a multiple base station.

Figure 1:
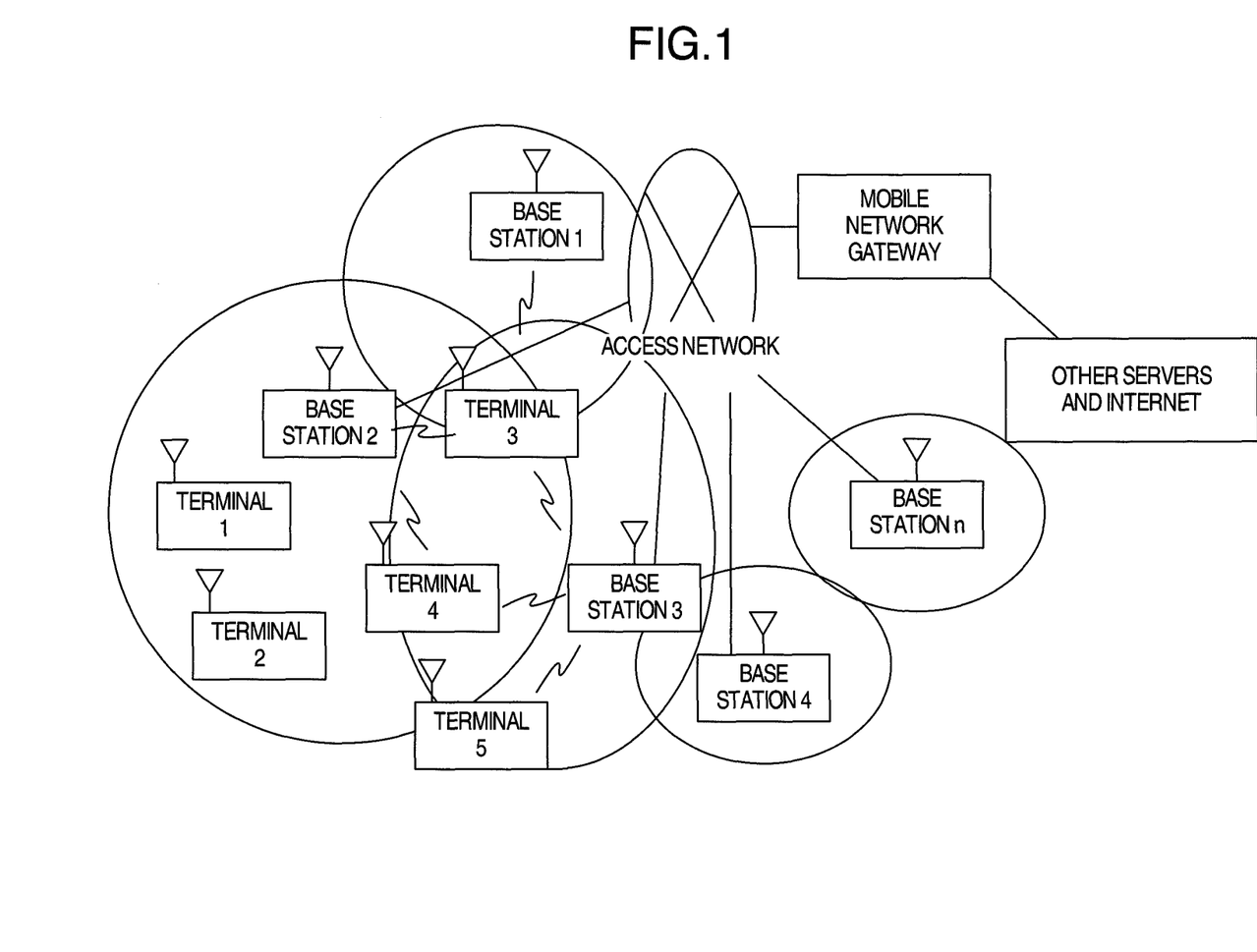
FIG. 1 illustrates a configuration of a mobile communication network.

FIG. 1 illustrates a configuration of a mobile cellular network. In the network, a plurality of mobile terminals (five mobile terminals in the figure) are connected to a plurality of mobile communication base stations. The mobile communication base station is mainly used for an access to a wireless network and a transmission and reception for wireless data. The plurality of mobile communication base stations are linked with an end point of, for example, a mobile network gateway of a mobile network via the network. An application server and the Internet are installed at the posterior end of the mobile network gateway.

Figure 2:
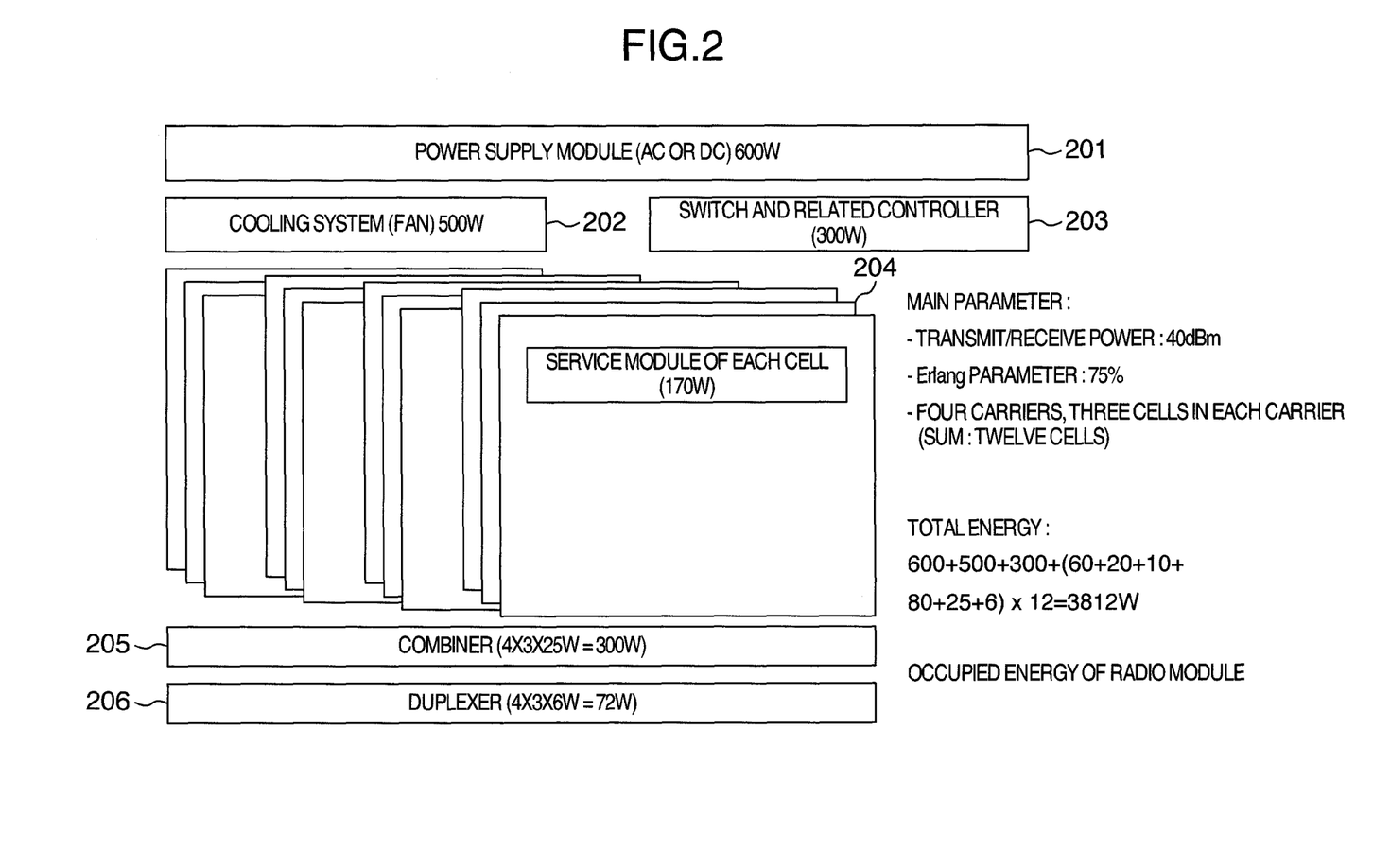
FIG. 2 illustrates a model example of energy consumption in a mobile communication base station.

FIG. 2 illustrates an exemplification of an energy consumption model of one base station. The energy consumption of the base station includes a power supply module (basic power supply) 201 (energy consumption: 600 W), a cooling system (fan) 202 (energy consumption: 500 W), and a switch and related controller (router unit) 203 (energy consumption: 300 W). The above-described energy consumption is effective power during full load. Along with reduction in the load (for example, a certain module enters a dormant state or off state), the energy consumption is also reduced. Further, the energy consumption of the base station includes a module related to a radio service, for example, a service module 204 (170 W), combiner 205 (25 W), and duplexer 206 (6 W) of each cell.

Modules 204 to 206 related to the radio service are generally grouped into a unit of a carrier and a cell. In FIG. 2, four carriers are illustrated, and three cell service modules correspond to each carrier. Further, each cell service module 204 exists in a base station 2 as a single module. When supposing that the energy consumption of each cell service module is 170 W, the total energy consumption is as follows. That is, 600+500+300+(170+25+6)*12=3812 W. As can be seen from the above-described equation, almost electric power is consumed by the modules 204 to 206 related to the radio service.

The cell service module 204 can be realized by a software method, but is generally realized by a hardware method using a card. The card can be turned on or off, or a dormant mode may be used. In the present invention, when the cell service module 204 is realized by the hardware method using the card, a method according to the present invention is applicable also to the cell service module 204 using the software method based on a simple parameter adjustment. Further, each of the cell service modules 204 can provide a certain amount of radio resources. Any of the radio resources according to the present invention are radio service resources capable of being provided by each base station, and can correspond to the number of users being supported within one area as well as to a maximum data transfer rate of a transferable physical layer within one area. When one or some of the cell service modules 204 in FIG. 2 are changed from a dormant mode to a working mode, the radio service resources capable of being provided by the base station increase along with the above-described change. Further, the number of users being supported within one area and the maximum data transfer rate of the physical layer also increase at the same rate, and on the other hand, the entire energy consumption of the base station also increases. Inversely, when one or some of the cell service modules 204 enter the dormant mode, or alternatively, all of the base stations enter the dormant state or the off state, the energy consumption of the base station is significantly reduced. However, the radio resources also are reduced and a service to be provided also is largely reduced.

Figure 3:
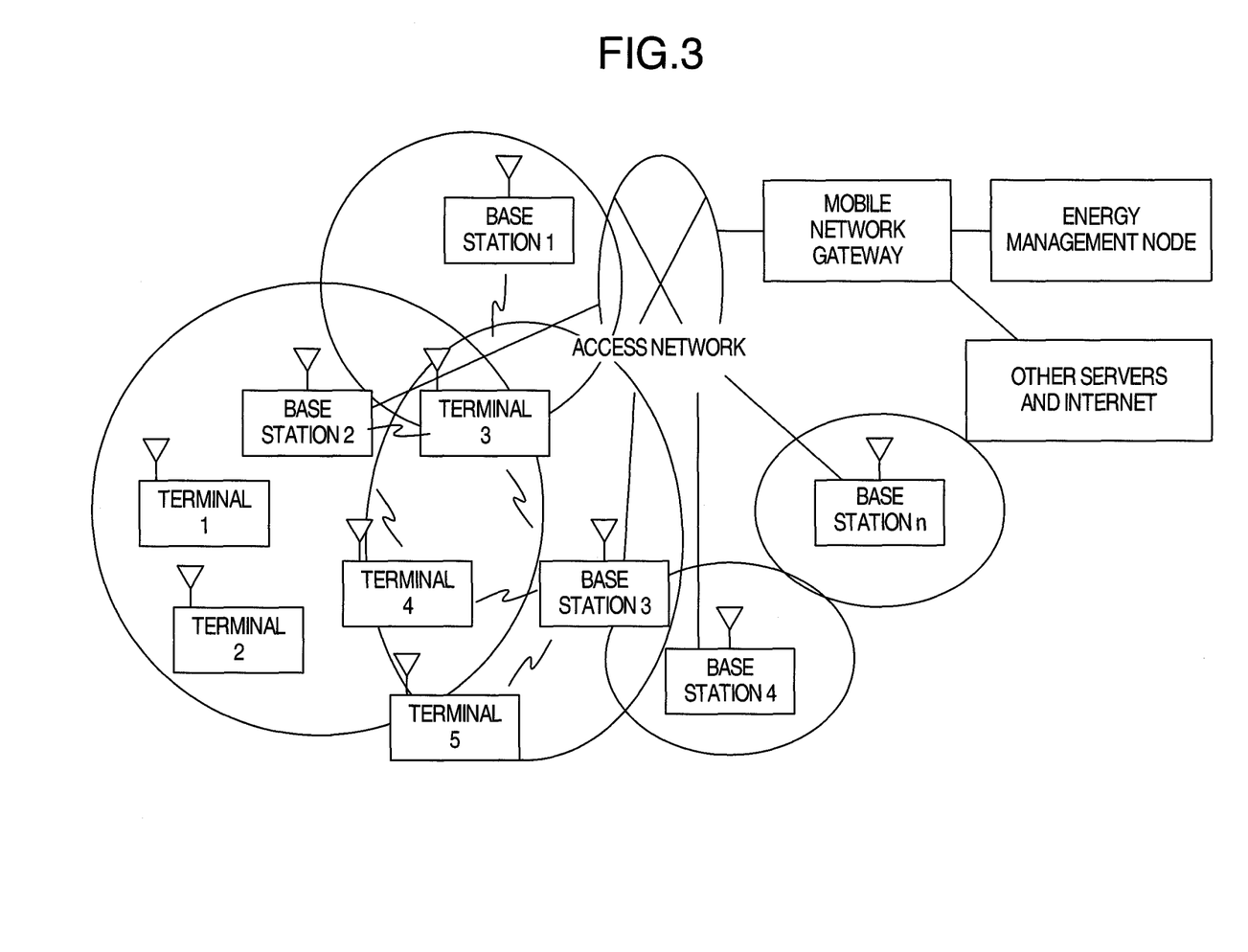
FIG. 3 illustrates a configuration of a mobile network having an energy management node according to the present invention.

FIG. 3 illustrates a network configuration of mobile network energy scheduling for supporting the central control according to the present invention. In the network side, according to the present invention, an energy management node (EMN) is more installed on the mobile network gateway as the central controller, resources of the entire network are scheduled, and energy consumption of the entire network is reduced. The base station 6 supporting an energy management according to the present invention adds a new communication function based on a conventional base station 2 and supports an information report to the energy management node and an implementation of an energy scheduling command.

Figure 4:
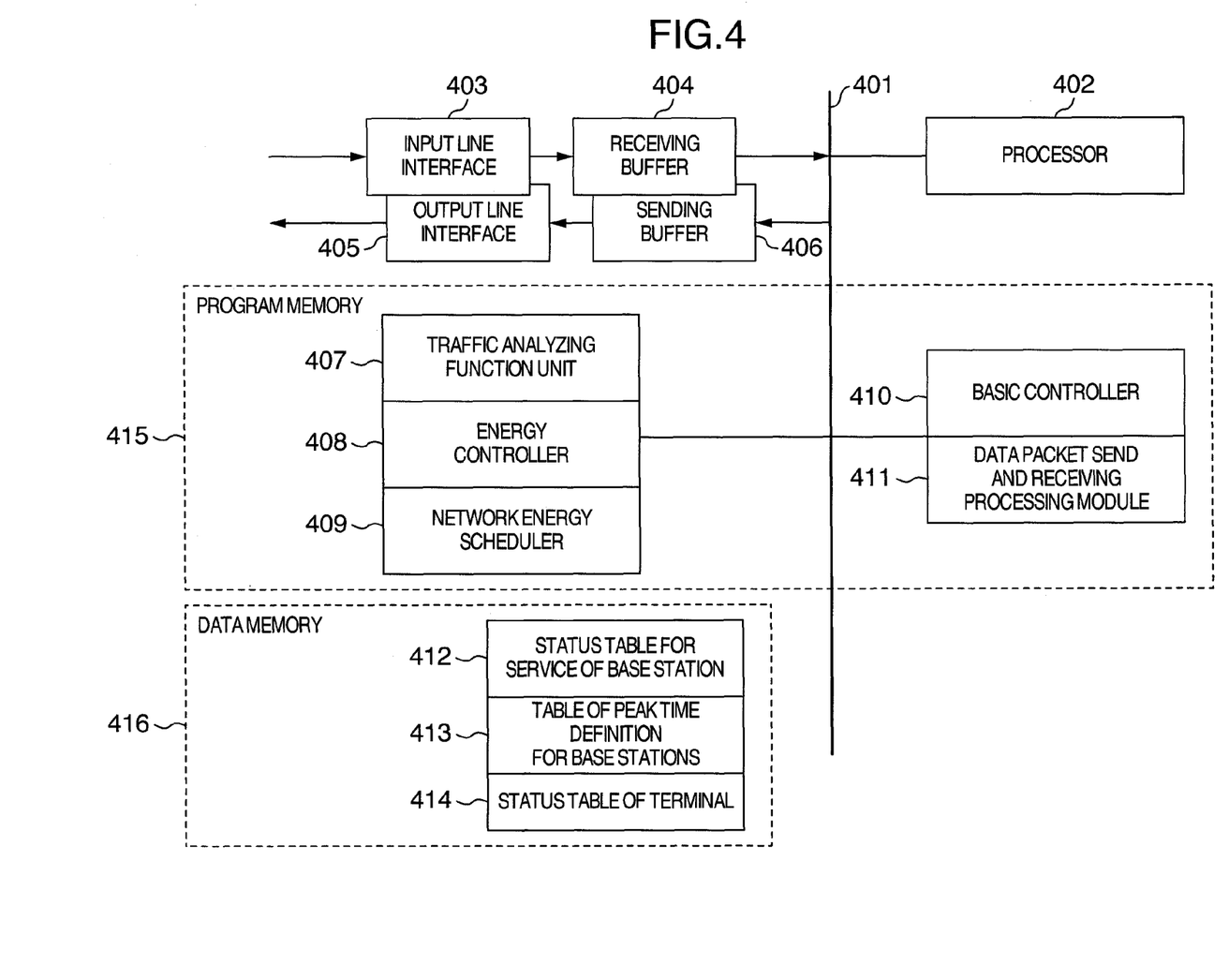
FIG. 4 illustrates an internal configuration of the energy management node according to the present invention.

FIG. 4 illustrates an internal configuration of the energy management node, namely, that of the communication control apparatus. The energy management node newly adds to a program memory a traffic analyzing function unit 407, an energy controller 408, and a network energy efficiency scheduler 409, and configures a controller by the above-described units. Among the above-described units, the traffic analyzing function unit 407 analyzes present communication traffic information from all the base stations of the entire network. The energy controller 408 is a basic protocol unit that communicates with a plurality of base stations. Among the units, its key unit is the network energy efficiency scheduler 409. The network energy efficiency scheduler 409 performs the energy scheduling with respect to all the base stations 2 within the network based on a traffic analysis and a terminal status of the base station, as well as according to a peak time level for Base station. Its results are transmitted to each base station via the energy controller 408.

Figure 7:
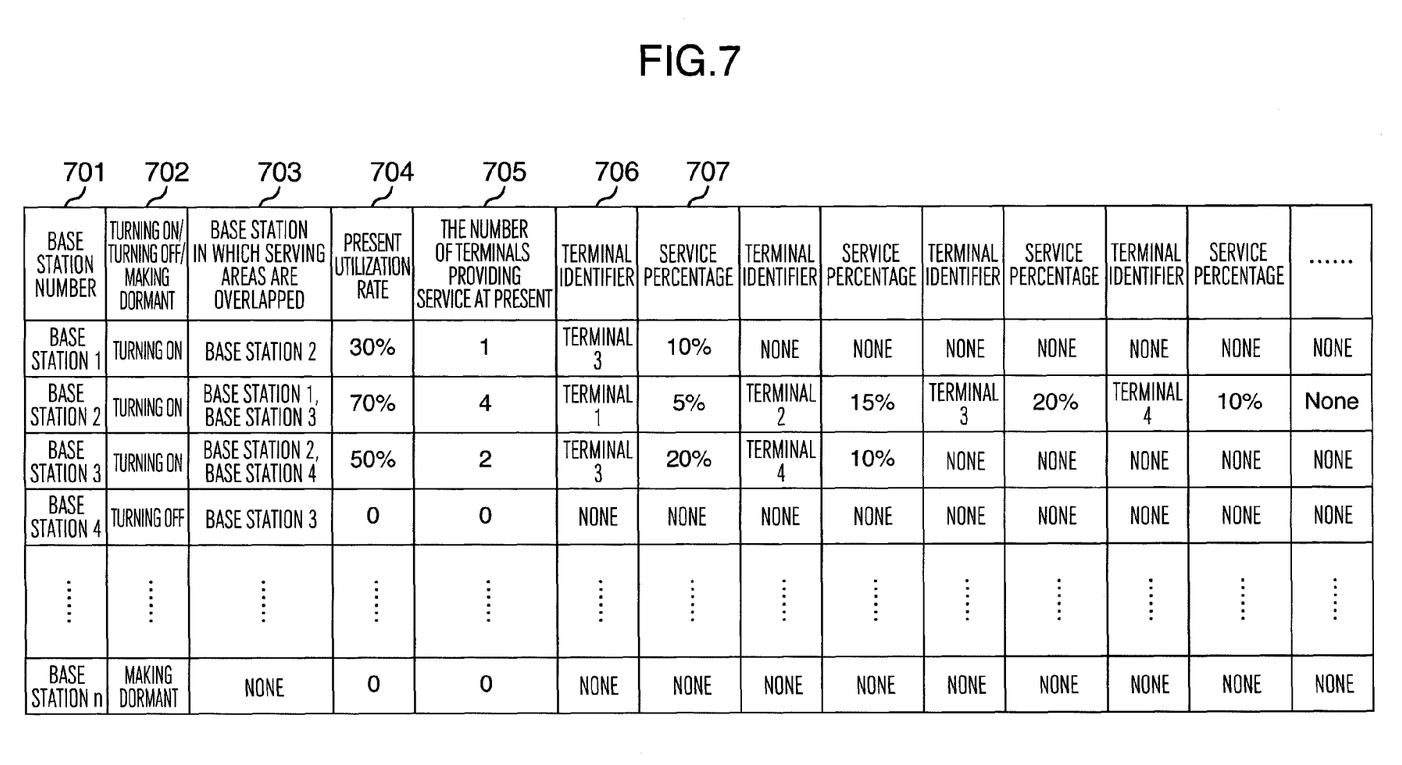
FIG. 7 illustrates a configuration of a status table of service for base station in the energy management node according to the present invention.

The energy management node newly adds to a data memory a status table of service for base station 412, a table of peak time definition for base stations 413, and a status table of terminal 414. In the status table of service for base station 412, present operation statuses of all the base stations in the mobile communication network are recorded, and its configuration is as illustrated in FIG. 7. A lower limit of a service level (radio resources to maintain a working status) to be maintained by each base station 2 at each time throughout the day is defined in the Table of Peak time definition for Base stations 413, and generally, is manually set by a mobile communication manager based on statistical results for a longer period of time. Working and traffic statuses of all the terminals are recorded in the status table of terminal 414, and referenced at the time of performing the energy scheduling according to the present invention.

Figure 5:
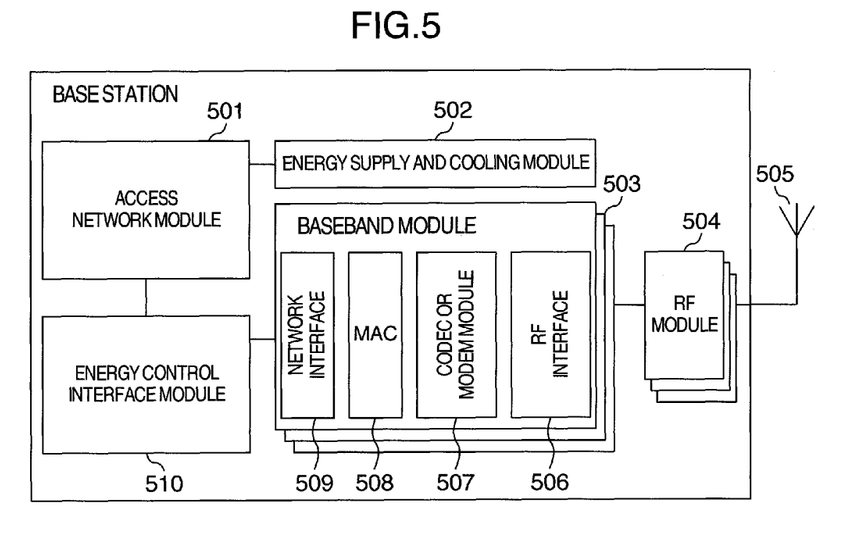
FIG. 5 illustrates an internal configuration of a mobile network base station according to the present invention.

FIG. 5 illustrates an internal configuration of the base station after reconstruction according to the present invention. An energy controlling interface module 510 that communicates with one energy management node is only added to the base station as compared with the conventional base station. Normally, the energy controlling interface module 510 reports operations and service statuses of the base station to the energy management node. After the energy management node performs the energy scheduling, the energy controlling interface module 510 receives a scheduling command from the energy management node and performs a corresponding energy command (receives and transfers some radio services and then turns off/makes dormant/wakes up some cell control modules or the entire base station system).

Figure 6:
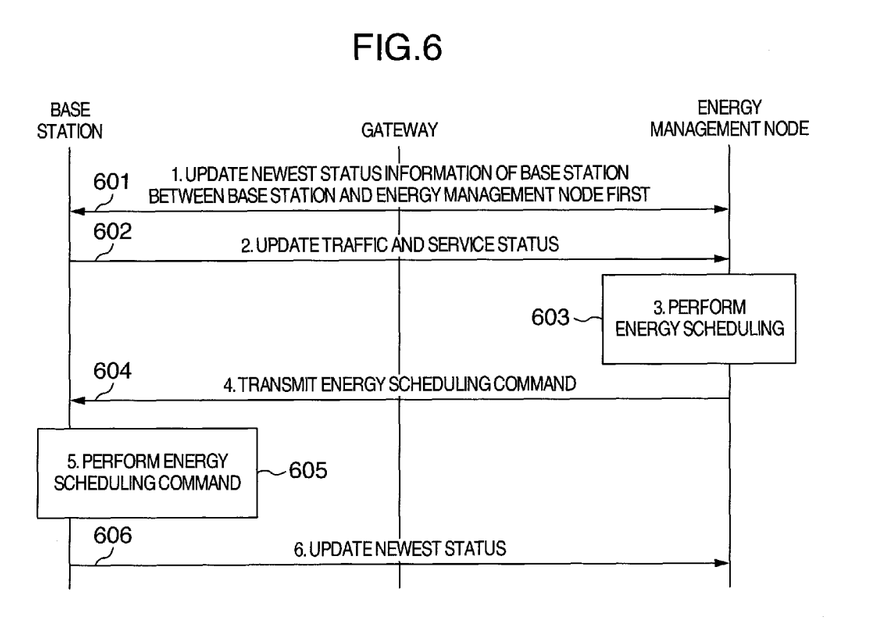
FIG. 6 illustrates a signaling process of energy control scheduling according to the present invention.

FIG. 6 illustrates a signaling process of the energy scheduling according to the present invention. At first, all of the base stations and the energy management nodes update the newest base station status information (step 601), and at the same time, the base station periodically reports the traffic and service status information to the energy management node (step 602). When requiring the scheduling, the energy management node performs the energy scheduling of the entire network (step 603). When taking an overlapped serving area into account as to the scheduling, the energy management node shifts services of some base stations to the other base stations and avoids an overlapped service. Further, the energy management node uses an optimized calculation method based on the repetition and finds an optimized scheduling result. The energy management node transmits results after the scheduling to all the base stations (step 604). Then, the base station performs a corresponding command (step 605), and transmits an execution result and an update status to the energy management node (step 606).

FIG. 7 illustrates a configuration of the status table of service for base station in the energy management node according to the present invention. Operation conditions, used statuses, and service statuses of all the base stations are recorded in the above-described table. Each record corresponds to one base station 6. Each record includes a base station identifier 701, a basic operation status 702 of the base station (for example, tuning on, turning off, or making dormant), the base station in which its own base station and the serving area are overlapped 703, a present utilization rate 704, the number of terminals under the present service provision 705, a terminal identifier 706, and a percentage in which a mobile terminal 1 occupies the present base station resources 707. In the column of a reference numeral 703, a base station in which the present base station and the serving area are overlapped is listed up. This resembles an adjacent cell table. When the present utilization rate 704 is a utilization rate of radio resources of the present base station 6 and the present base station 6 is turned on, 20% of radio resources (used for maintenance of basic signaling or wireless cell) are assumed to be used. A reference numeral 705 denotes the number of terminals under the present service provision. In the column of a reference numeral 706, an identifier of each mobile terminal is listed up. A reference numeral 707 denotes a percentage in which the mobile terminal occupies resources of the present base station.

Figure 8:
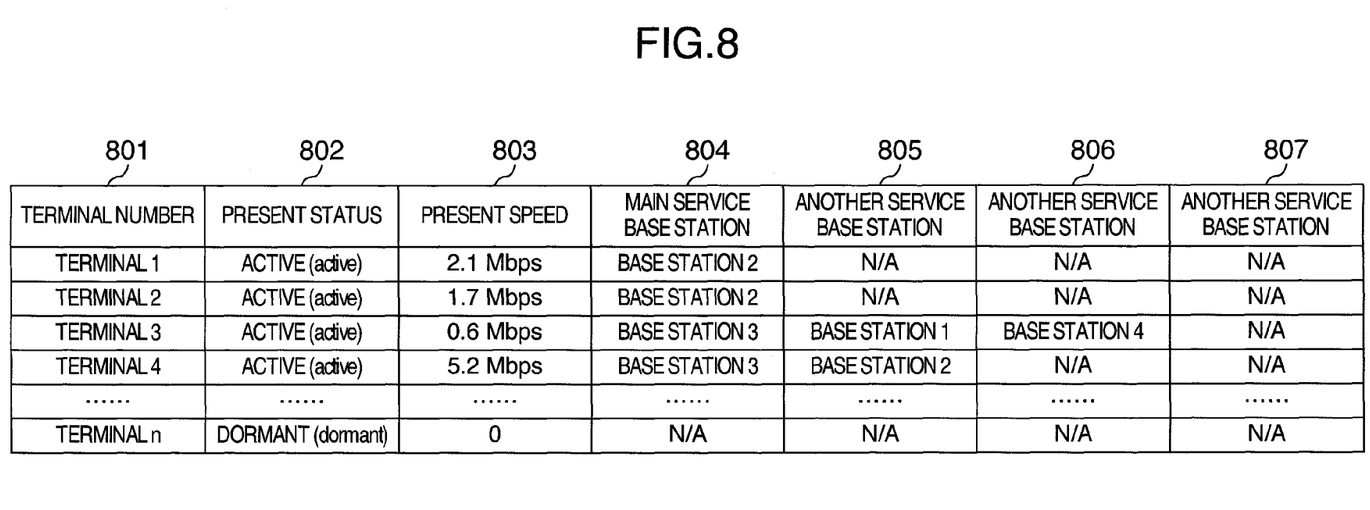
FIG. 8 illustrates a configuration of a status table of terminal in the energy management node according to the present invention.

FIG. 8 illustrates a configuration of a status table of terminal in the energy management node according to the present invention. A main object of the above-described table is to provide reference information for the energy scheduling to be performed by the energy management node. Each record corresponds to one mobile terminal. The table includes a terminal number (terminal identifier) 801, the present status 802 of the mobile terminal 1, and the present speed 803. In the columns on and subsequent to a reference numeral 804, the base stations providing a service to a mobile terminal at present are sequentially listed up.

Figure 9:
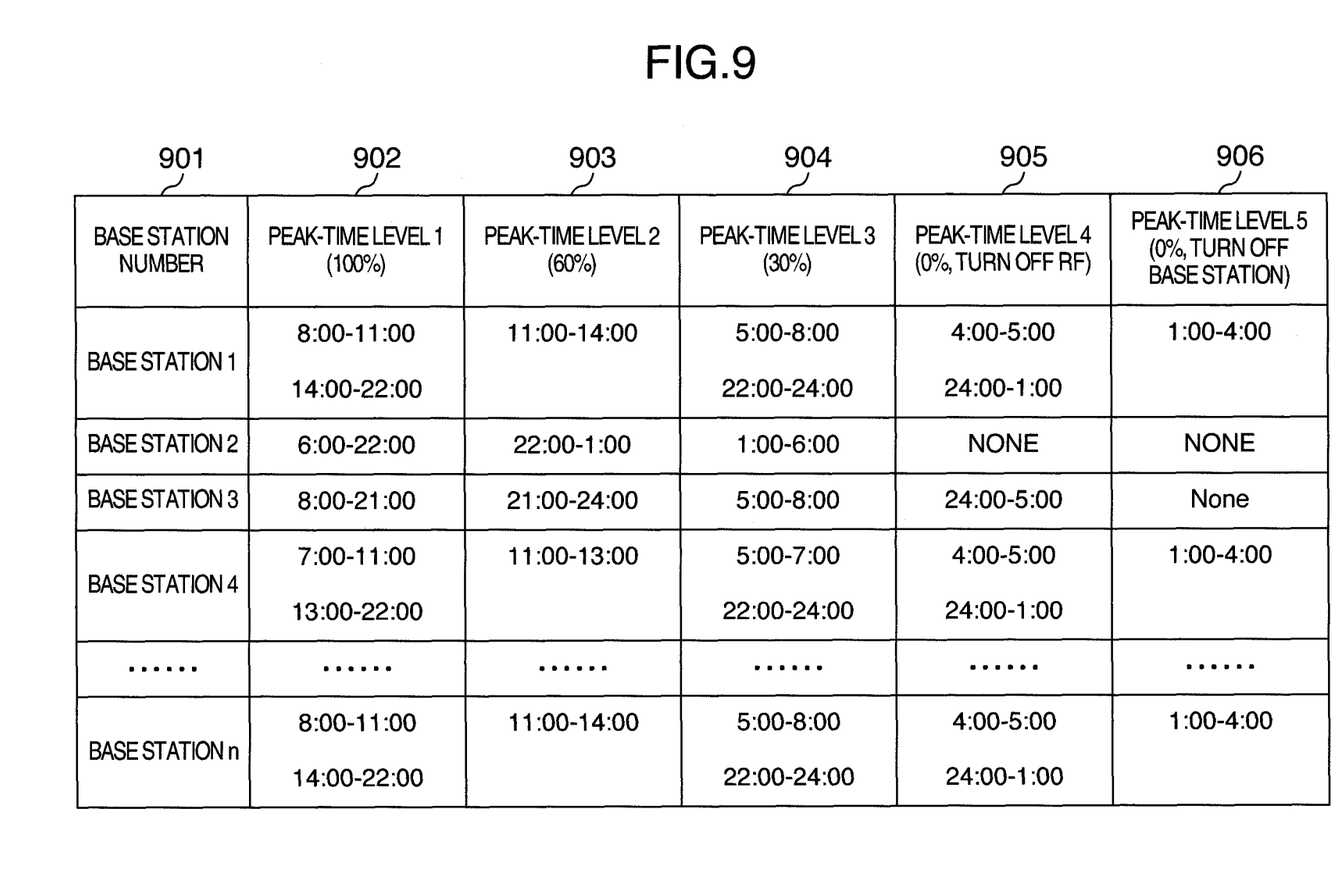
FIG. 9 illustrates a configuration of a table of peak time definition for base stations of all the base stations according to the present invention.

FIG. 9 illustrates a configuration of the table of peak time definition for base stations of all the base stations according to the present invention. This table has two main objects. A first object is to quantify a resource utilization rate of the base station to thereby simplify a calculation of the energy management node, save a signaling length, and simplify energy works of the base station. A second object is to integrate a past occupation rate of resources of a certain base station to thereby set a percentage of the minimum resources required to be turned on at a certain time band of a certain base station and guarantee a service of a mobile network based on experiences. FIG. 9 illustrates one simple realization example, and each base station has the following level of resource on.

Peak time level 1: all resources of a certain base station are turned on.

Peak time level 2: 60% of resources of a certain base station are turned on.

Peak time level 3: 30% of resources of a certain base station are turned on.

Peak time level 4: 0% of resources of a certain base station are turned on and the base station is always turned on. All radio service modules or cards are in the dormant status and the base station is enabled to restore its operating condition.

Peak time level 5: 0% of resources of a certain base station is turned on and the base station is turned off.

In an actual operation, a lowest line as a result of the energy scheduling has to satisfy resources specified at a peak time level at present with respect to one base station of one time band. For example, in a certain result of the scheduling of 13:00, the energy management node can shift the traffic of a mobile terminal 3 from the base station 2 to the base stations 1 and 3. Then, the energy management node sets the base station 2 to a peak time level 2. However, the base station 2 has to be operated at full resources at this time band based on content of the table of peak time definition for base stations. Or else, quality of the service is possibly reduced. Accordingly, the energy management node cannot accept this scheduling result. For this reason, in the scheduling process, the energy management node goes to the next optimized calculation method based on the repetition, and finds another result. Finally, the energy management node shifts all data blocks of the mobile terminal 3 as a found sub-optimal result from the base station 1 to the base station 2, and on the other hand, adjusts the base station 1 to a peak-time level 2. As a result, the base station 1 satisfies the table of peak time definition for base station. Here, the optimized calculation method based on the repetition of the energy scheduling includes various calculation methods, and since they are conventional techniques, a detailed description will be omitted.

The content of the table of peak time definition for base stations can be flexibly set based on actual conditions. For example, when a certain base station supports only two peak time levels (turning on and off), a process of the energy scheduling can be simplified.

Figure 10:
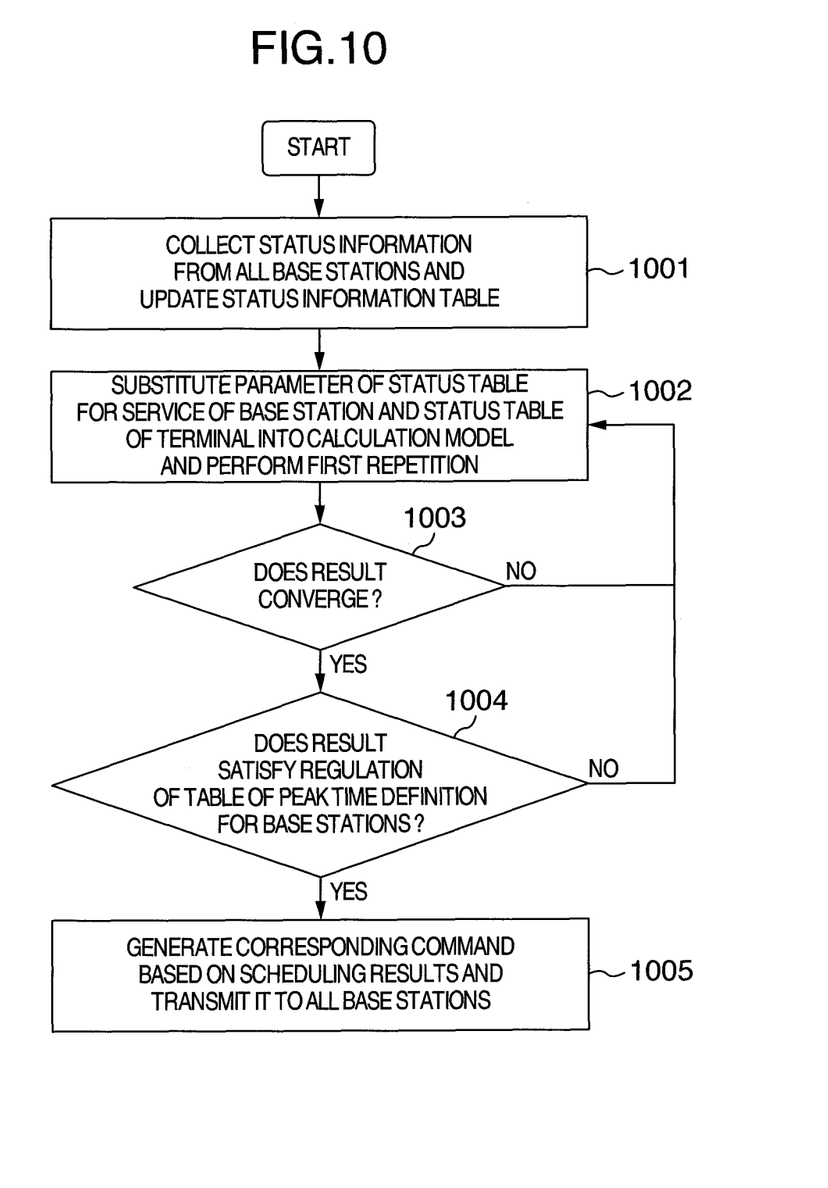
FIG. 10 illustrates an example process for performing the energy scheduling in the energy management node according to the present invention.

FIG. 10 illustrates an example process for the energy scheduling performed by the energy management node according to the present invention. At first, the energy management node collects status information from all the base stations and updates a status information table (step 1001). Then, when requiring the energy scheduling, the energy management node performs the energy scheduling based on a predetermined energy scheduling calculation method. In the present invention, a supposed energy scheduling calculation method is an optimized calculation method based on the repetition. In the calculation, the energy management node substitutes into a calculation model a parameter in the status table of service for base station and the status table of terminal, and performs a first repetition (step 1002). If a result converges (step 1003), the energy management node directly checks the table of peak time definition for base stations (step 1004). If the result satisfies its demand, the energy management node directly generates a scheduling result and transmits it to the corresponding base station. If both of the results of steps 1003 and 1004 are "NO", the energy management node returns to step 1002 and performs the next repetition. Until finding the optimized or sub-optimized result, the energy management node repeats the optimized calculation method. Steps 1002 to 1004 may be different depending on the different energy scheduling calculation method. Since the energy scheduling system according to the present invention supports the different energy scheduling calculation method, all the steps 1001 to 1005 are the same in the different energy scheduling calculation method. The simplest energy scheduling calculation method is a linear optimized calculation method based on the repetition. In the linear optimized calculation method, a repetition result of each time necessarily converges and the obtained result is optimal to only one parameter (for example, energy saving of the base station). A more complicated calculation method is a nonlinear optimized calculation method based on the repetition by using a plurality of parameters and the optimized calculation result is obtained based on the plurality of parameters by using the above-described nonlinear optimized calculation method based on the repetition. However, a converging solution is relatively reduced and a calculation process becomes complicated. The energy scheduling calculation method may be selected based on actual conditions.

Figure 11:
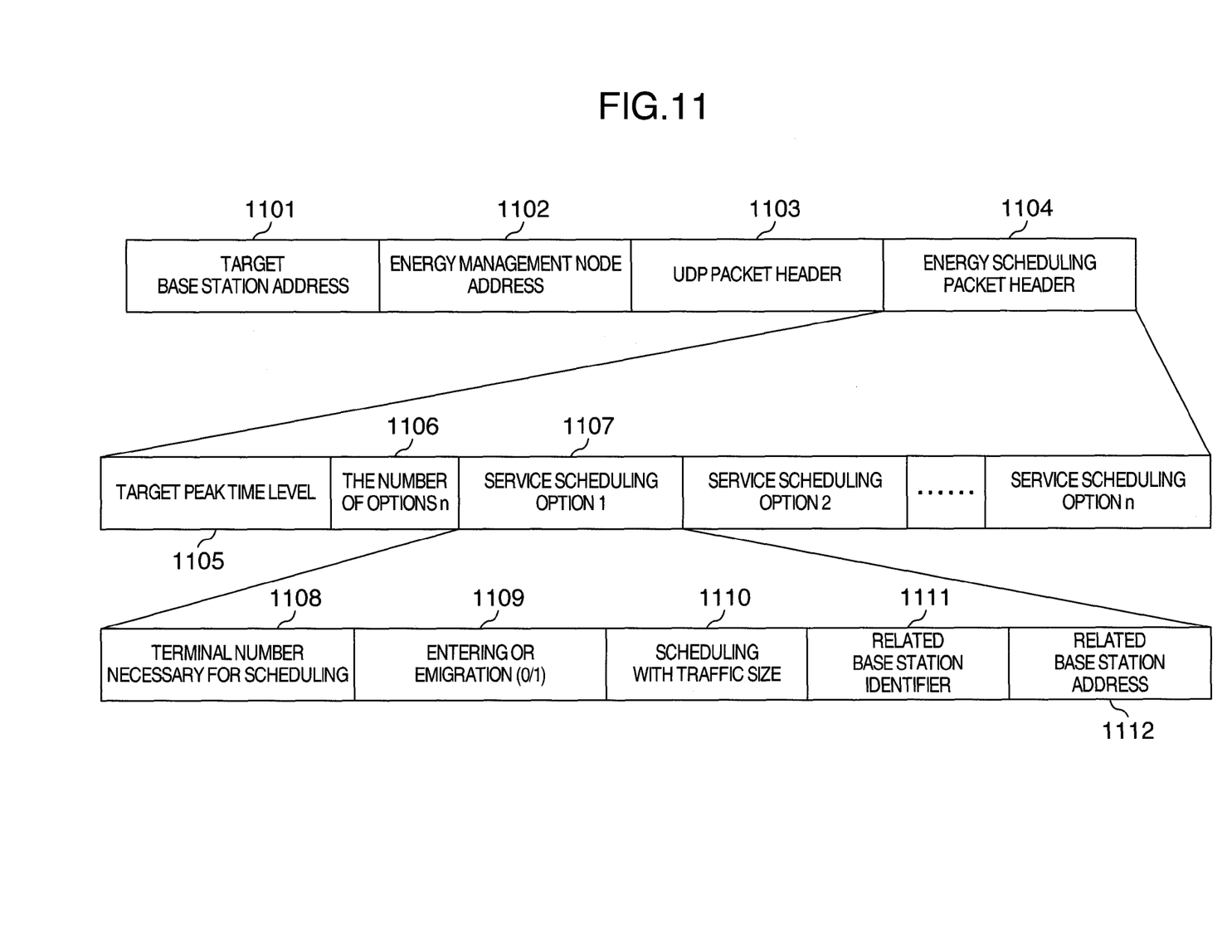
FIG. 11 illustrates a configuration of an energy management message transmitted to the base station by the energy management node according to the present invention.

FIG. 11 illustrates a configuration of the energy management message transmitted to the base station by the energy management node according to the present invention. Here, only an IP packet header and a portion subsequent to the IP packet header are described. The IP packet header includes an address of the target base station 1101 and an address of the energy management node 1102. An UDP packet header 1103 may further include a data port determined by a manager. An energy scheduling header 1104 is described behind the UDP packet header 1103. In the energy scheduling header 1104, a target peak time level to be attained by the base station 1105, the number of options n necessary for the adjustment 1106, and a response to each service scheduling option 1107 are specified. Further, the response to the service scheduling option 1107 includes a terminal identifier necessary for the scheduling 1108, a display of entering or emigration 1109, a size of the traffic necessary for the scheduling 1110, an identifier of the base station necessary for cooperated scheduling 1111, and an address corresponding to the last base station 1112.

Figure 12:
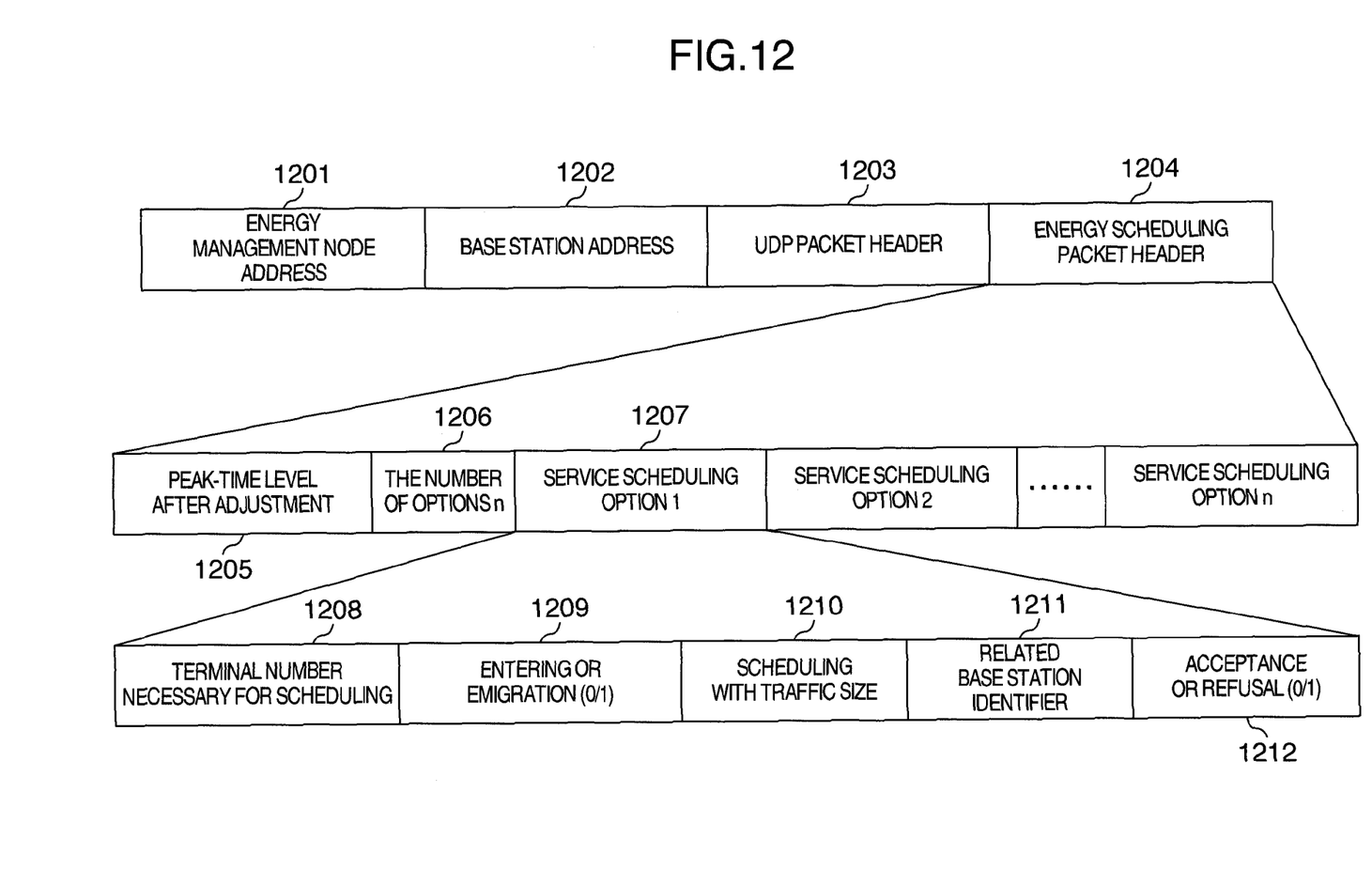
FIG. 12 illustrates a configuration of a message responded to the energy management node by the base station according to the present invention.

FIG. 12 illustrates a configuration of a message responded to the energy management node by the base station according to the present invention. Here, only the IP packet header and a portion subsequent to the IP packet header are described. The IP packet header includes an address of the energy management node 1201 and an address of a source base station 1202. Further, an UDP packet header 1203 may include a data port determined by a manager. The energy scheduling header 1204 is described behind the UDP packet header 1203. The energy scheduling header 1204 includes a target peak time level to be attained by the base station 1205, the number of options n necessary for the adjustment 1206, and a response to each service scheduling option 1207. Further, the response to each service scheduling option 1207 includes a terminal identifier necessary for the scheduling 1208, a display of entering or emigration 1209, a size of the traffic necessary for the scheduling 1210, an identifier of the base station necessary for the cooperated scheduling 1211, and an address corresponding to the last base station 1212 (acceptance or refusal). The energy management node can select the scheduling again based on the response content, and also accept the present results until the next scheduling.

Figure 13:
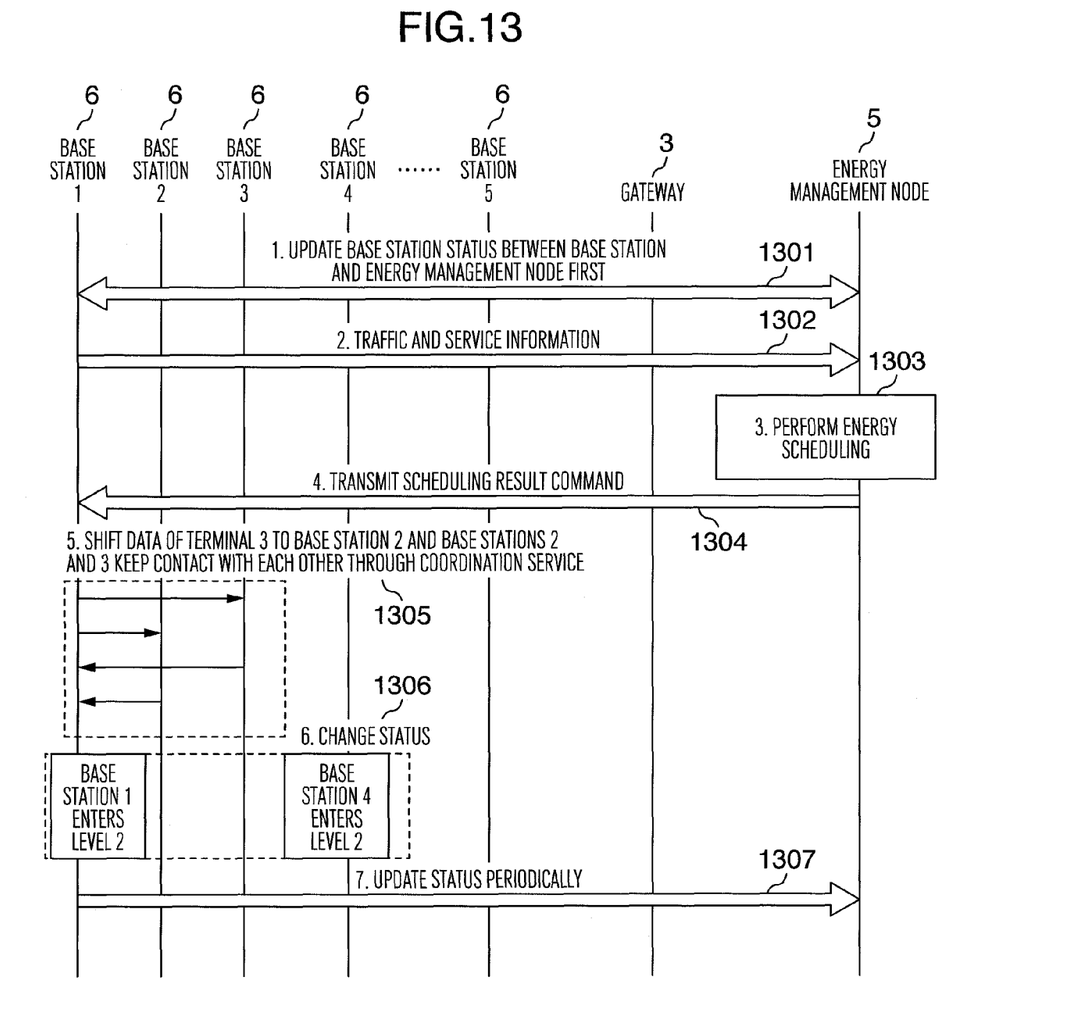
FIG. 13 illustrates an example process for performing the energy scheduling according to the present invention.

FIG. 13 illustrates an example process for the energy scheduling according to the present invention. In view of the optimized calculation method based on the repetition, as target parameters are more used in the repetition process, a converging speed of results gets slower. Various methods and models can be used in the optimized calculation process. FIG. 13 illustrates an example for one simple linear energy scheduling. Suppose that in this example, the number of the base stations, that of the terminals, and the service mode are performed at 13:00 as illustrated in FIGS. 7, 8, and 9.

At first, a base station status is updated between all the base stations and the energy management node (step 1301), and all the base stations update the traffic and service information (step 1302). When performing the energy scheduling, the energy management node performs the scheduling according to only a method in which the present energy consumption is minimized. Suppose, for example, that as to a first repetition result, the energy management node shifts the traffic of the mobile terminal 3 from the base station 2 to the base stations 1 and 3. Then, the energy management node sets the base station 2 to the peak time level 2. However, based on content of the table of peak time definition for base stations, the base station 2 has to be necessarily operated with full resources at this time band. Or else, there is the extremely high possibility that service quality is reduced. Accordingly, the energy management node cannot accept the above-described scheduling result. For this reason, in the scheduling process, the energy management node goes to the next repetition process and searches for another result. Finally, as to the found sub-optimized result, the energy management node shifts all data blocks of the mobile terminal 3 from the base station 1 to the base station 2, and on the other hand, the base stations 2 and 3 keep contact with each other through a coordination service. As described above, the energy management node adjusts the base station 1 to the peak time level 2, and the base station 1 can satisfy the table of peak time definition for base stations. The base station 4 has no terminal necessary for the service, but enters the peak time level 2 based on the table of peak time definition for base stations to thereby assure reliability of the service. After completing the energy scheduling (step 1303), the energy management node transmits the results to all the base stations in step 1304. As described above, a related data flow is shifted in step 1305 and then the base stations 1 and 4 are set to the corresponding peak time level (step 1306). Finally, all the base stations transmit the scheduling results to the energy management node.

The proposed communication control apparatus according to the present invention has a configuration in which energy consumption of the entire network can be optimized and a base station system of the entire network is not required to be modified, and as a result, it is expected that the communication control apparatus is applicable largely to the energy scheduling of the mobile communication network.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A communication control apparatus for performing control over a plurality of base stations that provide service to mobile terminals, comprising:
a receiver that receives communication conditions between each of the base stations and a mobile terminal within a serving area; and
a controller that performs control over energy consumption of each of the base stations, and turns on or off power supplies of wireless communication modules of a part of a plurality of wireless communication modules in each of the base stations based on the communication conditions;
wherein:
based on each time band of each of the base stations, the communication control apparatus previously determines a number of the wireless communication modules necessary for turning on a power supply in advance, and sets the number of the wireless communication modules necessary for turning on a power supply in advance to more than that of service demands at a peak time in each time band of each of the base stations; and
the number of the wireless communication modules of the service demands at a peak time in each time band of each of the base stations is obtained by collecting past data blocks.

2. A communication control apparatus for performing control over a plurality of base stations that provide service to mobile terminals, comprising:
a receiver that receives communication conditions between each of the base stations and a mobile terminal within a serving area; and
a controller that performs control over energy consumption of each of the base stations, and turns on or off power supplies of wireless communication modules of a part of a plurality of wireless communication modules in each of the base stations based on the communication conditions;
wherein:
based on each time band of each of the base stations, the communication control apparatus previously determines a number of the wireless communication modules necessary for turning on a power supply in advance, and sets the number of the wireless communication modules necessary for turning on a power supply in advance to more than that of service demands at a peak time in each time band of each of the base stations; and
the predetermined time band has at least two types of time bands, and which can turn on power supplies of equipments except for the wireless communication modules among the base stations in a first time band, and turn off power supplies of equipments except for the wireless communication modules among the base stations in a second time band.

3. A communication control apparatus for performing control over a plurality of base stations that provide service to mobile terminals, comprising:
a receiver that receives communication conditions between each of the base stations and a mobile terminal within a serving area; and
a controller that performs control over energy consumption of each of the base stations, and turns on or off power supplies of wireless communication modules of a part of a plurality of wireless communication modules in each of the base stations based on the communication conditions;
wherein:
based on each time band of each of the base stations, the communication control apparatus previously determines a number of the wireless communication modules necessary for turning on a power supply in advance, and sets the number of the wireless communication modules necessary for turning on a power supply in advance to more than that of service demands at a peak time in each time band of each of the base stations; and
the number of the wireless communication modules of the service demands at a peak time in each time band of each of the base stations is stored in a memory of the communication control apparatus.

4. A communication control apparatus for performing control over a plurality of base stations that provide service to mobile terminals, comprising:
a receiver that receives communication conditions between each of the base stations and a mobile terminal within a serving area; and
a controller that performs control over energy consumption of each of the base stations, and turns on or off power supplies of wireless communication modules of a part of a plurality of wireless communication modules in each of the base stations based on the communication conditions;
wherein the controller includes a traffic analyzing function unit that analyses traffic of the plurality of base stations, a network energy scheduling unit that performs energy scheduling with respect to each of the base stations in a network according to a number of the wireless communication modules of the service demands at a peak time in each time band of the base station based on traffic conditions and terminal status of the base station analyzed by the traffic analyzing function unit, and an energy controller that communicates with the plurality of base stations and transmits energy scheduling results of the network energy scheduling unit to each of the base stations.

* * * * *